United States Patent [19]

Angelo

[11] Patent Number: 5,944,821
[45] Date of Patent: *Aug. 31, 1999

[54] SECURE SOFTWARE REGISTRATION AND INTEGRITY ASSESSMENT IN A COMPUTER SYSTEM

[75] Inventor: Michael F. Angelo, Houston, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,722

[22] Filed: Jul. 11, 1996

[51] Int. Cl.$^6$ ............................................. G06F 11/00
[52] U.S. Cl. ................................. 713/200; 713/202
[58] Field of Search .................. 395/183.14, 183.12, 395/183.01, 183.13, 185.01, 185.1, 704, 186, 187.01, 188.01; 707/9; 380/3, 4, 23, 25; 713/200, 201, 202; 714/36, 38; 710/260

[56] References Cited

U.S. PATENT DOCUMENTS

| | | | |
|---|---|---|---|
| 5,421,006 | 5/1995 | Jablon et al. | 395/183.14 |
| 5,537,540 | 7/1996 | Miller et al. | 395/183.12 |
| 5,657,445 | 8/1997 | Pearce | 395/186 |
| 5,694,569 | 12/1997 | Fischer | 395/186 |
| 5,694,582 | 12/1997 | Pearce | 395/500 |

OTHER PUBLICATIONS

Intel486™ SL Microprocessor SuperSet System Design Guide, Nov. 1992, pp. 12–14 through 12–29.
Intel486™ SL Microprocessor SuperSet Programmer's Reference Manuel, Nov. 1992, pp. 6–28 through 6–53.

*Primary Examiner*—Joseph E. Palys
*Attorney, Agent, or Firm*—Akin, Gump, Strauss, Hauer & Feld, L.L.P.

[57] ABSTRACT

A method for providing secure registration and integrity assessment of software in a computer system is disclosed. A secure hash table is created containing a list of secure programs that the user wants to validate prior to execution. The table contains a secure hash value (i.e., a value generated by modification detection code) for each of these programs as originally installed on the computer system. This hash table is stored in protected memory that can only be accessed when the computer system is in system management mode. Following an attempt to execute a secured program, a system management interrupt is generated. An SMI handler then generates a current hash value for the program to be executed. In the event that the current hash value matches the stored hash value, the integrity of the program is guaranteed and it is loaded into memory and executed. If the two values do not match, the user is alerted to the discrepancy and may be given the option to update or override the stored hash value by entering an administrative password.

24 Claims, 4 Drawing Sheets

SECURE SOFTWARE REGISTRATION AND INTEGRITY ASSESSMENT IN A COMPUTER SYSTEM

CROSS-REFERENCE TO RELATED APPLICATION

The present invention relates to computer system security as does commonly-owned U.S. Pat. No. 5,537,540, entitled "TRANSPARENT, SECURE COMPUTER VIRUS DETECTION METHOD AND APPARATUS."

BACKGROUND OF THE INVENTION

1. Field of the Invention

The present invention relates to a method for providing secure registration and integrity assessment of software in a computer system.

2. Description of the Related Art

The field of computer security, encompassing both computer protection and integrity assessment, is becoming increasingly important given the ever-expanding role computers play in today's society. Huge amounts of money are invested by companies and individuals to purchase executable software. Even more money and time is spent developing the information contained in data files such as text documents and spreadsheets. Protecting these resources is therefore an important concern. Security-conscious users are requesting that security and integrity features be incorporated into their personal computers to restrict access to critical files and to guarantee the trustworthiness of installed programs.

One prior method of offering protected access to files involves the use of passwords. A password is typically stored in battery-backed CMOS memory. Before the user is allowed access to the computer, the user is required to enter a password. Once entered, the computer compares the entered password to the password in CMOS and, if they match, the user is allowed access. The main disadvantage with this scheme, as discussed more fully below, is that passwords offer very little protection against certain forms of data corruption. Second, other forms of attack can bypass the CMOS memory because it is not read-protected in many cases. To address this concern, passwords are sometimes encoded. Once the encoding scheme is reverse-engineered, however, security is easily breached. Further, the CMOS memory could simply be disconnected from its battery, thus losing any contents including the password.

A related art to that of computer protection is integrity assessment. Integrity assessment is used herein to denote methods used to ascertain the trustworthiness of data or software code. Software is assumed to be trustworthy when initially installed, and the system is in its most reliable state immediately following a proper installation. System software that has been changed, whether through an unauthorzed deliberate act or through an accidental system malfunction, is said to have undergone an "integrity violation". In such cases, the software is presumed to be untrustworthy and capable of violating the integrity of other parts of the computer system. It should be noted that in this context, integrity and trustworthiness have little to do with defects in the design of the software, or bugs in the in the software, although certain bugs could cause the integrity of the software to be jeopardized.

"Trusted software" is normally defined to be a subset of all software used by a computer system, the subset being responsible for the correct and reliable operation of the system. Trusted software is also responsible for enforcing a system's security policy. Maintaining the integrity of trusted software is therefore particularly important.

The two main causes of software untrustworthiness are file corruption and viruses. File corruption usually follows a system failure occurring during a file transfer (i.e. the system is turned off while a file is being copied onto the hard disk etc.). Another—and much greater—threat to software integrity is the problem of malicious software code (also referred to as "computer viruses").

While many computer viruses are relatively benign, computer viruses can be hostile, clandestine and created to target specific types of software or hardware. They can be introduced into a computer in as many ways as the computer can communicate externally, such as through the floppy drive, a network connection or a modem connection. Viruses are typically designed to replicate by secretly attaching copies of themselves to files or boot records so that the user is unaware of the intrusion. It is important to note that once a virus has attached itself to a host program, the file must be different and its integrity has been violated.

Once infected, any subsequent copies of the host file also contain the virus, thereby increasing the potential for destruction. The virus is then activated when the file is executed. Consequently, a virus attached to a data file may remain dormant because the data file is not executable.

One common commercial method of assessing the integrity of user software is to check for viruses by running a virus checking software program. Such programs rely on the characteristics of the known viruses to detect their presence. A new virus may not be detectable by the virus checking software. Additionally, if a virus is present, the virus checking software itself is susceptible because it is loaded from the infected hard disk and must run in memory that could be infected.

Another method of assessing a file's integrity prior to executing involves computing an integrity assessment code for the file and verifying that the code matches a predetermined value. Checksums (a type of integrity assessment code) are adequate for detecting accidental modifications of data. However, they are an insecure defense against viruses. A well-designed virus aimed at bypassing normal security features can easily attach itself to a host program without resulting in a different checksum.

To address this problem, advanced modification detection codes (MDCs) have been developed to specifically detect deliberate corruption of data, and are superior to simple checksums. It is intended to be computationally infeasible to modify data so as to preserve a specific modification detection code value. Modification detection codes are sometimes referred to by other names, including: "cryptographic checksums", "cryptographic hashes", "secure hash algorithms", and "message digests". The term "secure hash value" or "hash value" is used throughout the remainder of this specification to refer generally to a value generated by a modification detection code, the value being specific to a given software application. Modification of the software results in a different hash value.

In some earlier systems, a secure hash value is calculated and stored for newly installed software. Thereafter, when the computer is turned on again, the stored hash value is compared to a newly calculated value. If a discrepancy is found, the user is alerted. A main disadvantage with this method is that the integrity assessment codes must be stored on the hard disk, thus making the codes themselves susceptible to attack by malicious code. Reverse-engineering a modification detection code, while difficult, is not a mathematically intractable problem. Thus, software-only protective products can offer only limited insurance against the attack of malicious code, due mainly to architectural weakness present in most computer systems. A potential solution is to embed the modification detection code in a permanent read-only memory device, but this can make system reconfiguration quite difficult.

A more secure technique is described in U.S. patent application Ser. No. 5,421,006, filed Apr. 20, 1994, entitled "METHOD AND APPARATUS FOR ASSESSING INTEGRITY OF COMPUTER SOFTWARE", which is hereby incorporated by reference. The described technique uses CMOS memory as a non-volatile memory (NVRAM). The NVRAM has one location which can be write-protected by a write once bit. Once set, the write protection cannot be removed until the computer is reset. This location holds secure hash values for certain operating system programs located on the hard disk. Software in the ROM BIOS needs the protected operating system programs and the hash values of those programs. If the calculated hash value matches that stored in the NVRAM, then the programs are secure and can be executed.

In one embodiment; the write protection is activated at this time. In an alternative embodiment the write protection is activated later, before the first non-checked program is executed. The operating system is then loaded and boots the computer. The operating system can then check each additional file before it is executed. Checking consists of calculating the hash value of a program, comparing it to a value in a previously checked table, and passing the program if there is a favorable comparison. If the hash value of the program does not match that stored in protected memory, the program has changed and may include a virus.

While the technique is very secure and usable in an ideal environment, a PC is far from an ideal environment. Files change often, causing bookkeeping problems due to the need to update MDCs. Further, many PC's have very complicated booting procedures that can be interfered with by the technique.

An improvement upon the aforementioned technique has been described in commonly-owned U.S. Pat. No. 5,537,540, entitled "TRANSPARENT, SECURE COMPUTER VIRUS DETECTION METHOD AND APPARATUS", and hereby incorporated by reference. This invention (hereinafter referred to as the "SAFESTART patent") reduces the administrative requirements of the earlier technique. A reserved non-DOS hard disk partition is used to pre-boot the computer system and provide a secure environment from which to verify files. Upon power-up or reset, the computer performs the power-on-self-test, during which it checks a SAFESTART track by comparing its hash value to value stored in NVRAM. If the integrity of the SAFESTART track is verified, the first "SAFESTART" routine is loaded into memory and executed.

The SAFESTART routine first checks the master boot record and boot sectors of the hard disk. This verification captures a large majority of viruses and is performed before any code residing in those areas is executed, thus preventing the spread of any discovered viruses. Further checks are performed on SAFESTART files before each is executed. Eventually, system files and any additional designated user files are verified. Since the computer system booted from an atypical partition, the drives are remapped to account for the shift in logical disk drive addressing. When the verification process is completed, SAFESTART files are cleaned up, a latch is set to prevent unauthorized modification of the initial hash values, and control is returned to the BIOS to boot the user operating system.

The reserved non-DOS partition contains three different sets of DOS: a copy of the User DOS (if DOS is installed on the user partition), a subset of system DOS called SDOS, and a backup of the DOS subset. According to the patent, the reserved non-DOS partition is bootable by SAFESTART. During SAFESTART, the default operating system is the User DOS, if installed. Otherwise, SDOS is used as the pre-boot operating system. If one of the operating systems becomes infected, an unaffected copy of DOS is dynamically restored. Thus, a computer system implemented according to the SAFESTART patent insures that designated software is trustworthy following a power-up cycle.

At a certain point after startup, the set of trusted software may become vulnerable to attack, and can no longer be relied upon to perform trusted operations. In order to revalidate the trusted software or reconfigure the integrity assessment software, prior protection schemes such as those disclosed in the SAFESTART patent require that the system be restarted. This interruption is often time-consuming and may present an unwelcome break in computing activities.

SUMMARY OF THE INVENTION

A computer system according to the present invention incorporates the capability to protect against the execution of unauthorized or modified code in real time, as opposed to relying solely on power-up routines to maintain a secure and trusted path. In general, a secure hash table (or other type of integrity assessment code) is provided that contains a secure hash value for each program that the user wants to track. The hash table is stored in protected memory that can only be accessed when the computer system is in a system management mode. Execution of a secured application is then predicated on its current hash value matching a corresponding hash value in the secure hash table. Secure execution of programs such as those described in the SAFESTART patent is thus not limited to POST (Power On Self Test).

More particularly, the invention improves upon the SAFESTART patent and similar concepts by allowing real-time secure access to and calculation of stored secure hash tables, stored hash values and hash algorithms for verifying the trustworthiness of applications prior to execution. In one embodiment of the invention, a secure hash value is generated for a piece of software when it is installed on the computer system. Once generated, the hash value for the newly-installed software is then stored in a secure hash table that contains hash entries for each protected application. A "secure hash value" in the preferred embodiment is 160 bits of data (20 bytes) that is essentially a mathematical representation of a file. If any bits in the file are changed, a different hash value will result.

When the user attempts to execute the secured application, a system management interrupt (SMI) is generated. The SMI places the computer system in a system management mode, causing an SMI handler routine to be executed. The SMI handler first generates a current hash value for the program to be executed. Next, the SMI handler checks the stored hash table for an entry for the secured application. If a hash value entry is found, it is compared with the newly-calculated hash value for the secured application. In the event the two values match, the integrity of the application is guaranteed and it is loaded into memory and executed. For security-sensitive applications, the entire application or a portion of it is loaded into system management mode memory (hereinafter "SMM memory") prior to running the execution. If the two values do not match, the user is alerted to the discrepancy and may be given the option to update or override the stored hash table entry by entering an administrative password.

In an alternate embodiment of the invention, a secured hash value for the table itself could be maintained in SMM memory, with the larger hash table being stored in normal memory. A current table hash value is generated for the hash table before a hash table entry is accessed. The current table hash value is then compared with the table hash value stored in SMM memory. If the values are equal, the integrity of the hash table is verified and the new hash value of the program to be executed can safely be compared with its original value. This embodiment of the invention is useful for overcoming problems associated with the limited size of SMM memory. Both of the aforementioned embodiments of the invention have the additional advantage of being operating system independent.

In yet another embodiment of the invention, a modification to the loader is used to dynamically protect against virus infestation and unauthorized modifications. The loader (a part of the operating system that puts programs into memory for execution) is modified such that it verifies the program's hash value prior to execution. The comparison of hash values is secure because when the computer is booted, steps are taken to assure that the loader and the stored hash table are secure (i.e., the invention builds on a trusted boot facility such as that described in the SAFESTART patent). The stored hash table is preferably located in either locked NVRAM or SMM memory. In addition to operating in real time, this embodiment has the advantage that special hardware is not required to lock an NVRAM bit to protect hash values, as was the case with earlier protection schemes.

The invention has a wide variety of potential applications, including: verifying a power-on password used to permit access to computer system, registering software for use on specific computer systems, and preventing certain types of programs from being run. Numerous other applications for the present invention have also been considered, some of which are described below in the detailed description.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Prior to discussing the preferred embodiment of the invention, a general summary of the operation of a typical personal computer incorporating secure software registration and integrity assessment capability is provided.

Figure 1:
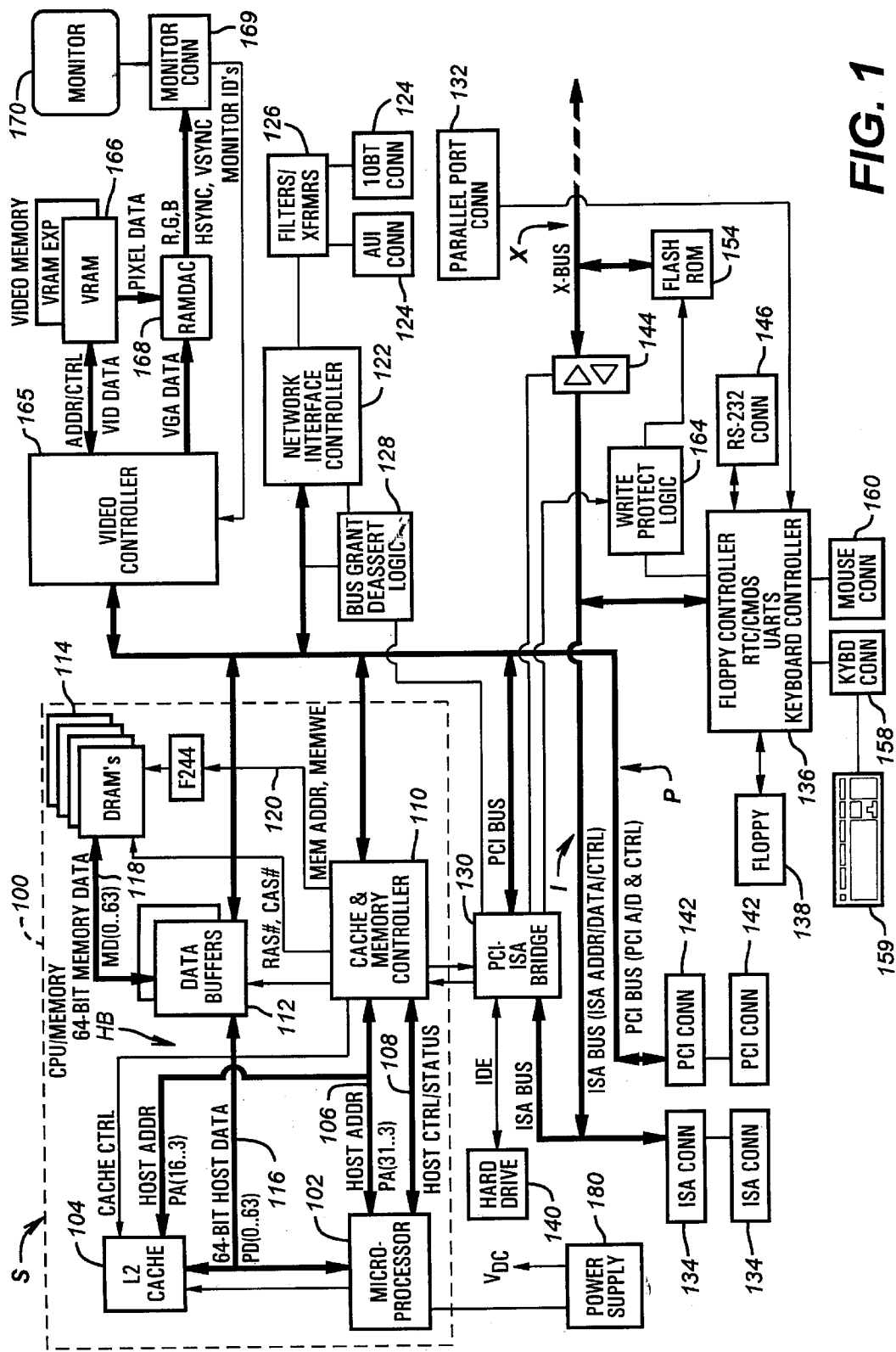
FIG. 1 is a block diagram of a computer system according to the present invention.

Referring to FIG. 1, a computer system S according to the present invention is shown. In the preferred embodiment, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar processors. The processor 102 drives data, address, and control portions 116, 106, and 108 of a host bus HB. A level 2 (L2) or external cache memory 104 is connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and develop the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) could be similarly connected.

In the disclosed embodiment the PCI-ISA bridge 130 also includes miscellaneous system logic. This miscellaneous system logic contains counters and timers as conventionally present in personal computer systems, an interrupt controller for both the PCI and ISA buses P and I, and power management logic. Additionally, the miscellaneous system logic may include circuitry for a security management system used for password verification and to allow access to protected resources.

The PCI-ISA bridge 130 also includes circuitry to generate a "soft" SMI (System Management Interrupt), as well as SMI and keyboard controller interface circuitry. The miscellaneous system logic is connected to the flash ROM 154 through write protection logic 164. Preferably, the PCI-ISA bridge 130 is a single integrated circuit, but other combinations are possible.

A series of ISA slots 134 are connected to the ISA bus I to receive ISA adapter cards. A series of PCI slots 142 are similarly provided on the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

A network interface controller (NIC) 122 is also connected to the PCI bus P. Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a local area network (LAN).

A combination I/O chip 136 is connected to the ISA bus I. The combination I/O chip 136 preferably includes a real-time clock, two UARTS, a floppy disk controller for controlling a floppy disk drive 138, and various address decode logic and security logic to control access to the CMOS memory (not shown) and power-on password values. A control line is provided to the read and write protection logic 164 to further control access to the flash ROM 154. Serial port connectors 146 and parallel port connector 132 are also connected to the combination I/O chip 136.

An 8042 or keyboard controller is also included in the combination I/O chip 136. The keyboard controller is of conventional design and is connected in turn to a keyboard connector 158 and a mouse or pointing device connector 160. A keyboard 159 is connected to the computer system S through the keyboard connector 158.

A buffer 144 is connected to the ISA bus I to provide an additional X-bus X for various additional components of the computer system S. A flash ROM 154 receives its control, address and data signals from the X-bus X. Preferably, the flash ROM 154 contains the BIOS information for the computer system and can be reprogrammed to allow for revisions of the BIOS.

An additional feature of the computer system S is a System Management Mode (SMM), as discussed at length immediately below. It is also noted that FIG. 1 presents an exemplary embodiment of the computer system S and it is understood that numerous other effective embodiments could readily be developed as known to those skilled in the art.

The System Management Mode

Certain microprocessors, such as the Pentium® processor from Intel Corporation, have included a mode referred to as system management mode (SMM), which is entered upon receipt of a system management interrupt (SMI). Originally, SMIs were power management interrupts devised by Intel Corporation for portable systems. Portable computers often draw power from batteries which provide a limited amount of energy. To maximize battery life, an SMI is asserted to turn off or reduce the power to any system component that is not currently in use. Although originally meant for laptop computers, SMIs have become popular for desktop and other stationary models as well.

SMIs are asserted by either an SMI timer, by a system request, or by other means. An SMI is a non-maskable interrupt having almost the highest priority in the system. Only the reset signal R/S* and cache flush signal FLUSH*, which can be conceptualized as interrupts, have a higher priority than the SMI. When an SMI is asserted, a microprocessor maps a portion of memory referred to as the system management mode memory ("SMM memory") into the main memory space. The entire CPU state is then saved in the SMM memory (in the CPU register dump 210 of FIG. 2) in stack-like, last in/first out fashion. After the initial processor state is saved, the processor 102 begins executing an SMI handler routine, which is an interrupt service routine to perform specific system management tasks such as reducing power to specific devices or, as in the case of the present invention, providing security services. While the routine is executed, other interrupt requests are not serviced, and are ignored until the interrupt routine is completed or the microprocessor is reset. When the SMI handler completes its task, the processor state is retrieved from the SMM memory, and the main program continues. An SMI active signal referred to as the SMIACT* signal is provided by the processor to indicate operation in SMM.

As mentioned, following assertion of its SMI input (this is generally an active low signal), the processor 102 calls the SMI handler, which addresses an address space that is separate from ordinary main memory. Thereafter, all memory accesses refer only to SMM memory 200. Input/output ("I/O") accesses via instructions such as IN or OUT are still directed to the normal I/O address space, however. One advantageous side-effect of the hardwired separate address SMM area is that the routines stored in this space cannot be snooped by the cache, providing an additional layer of protection.

In a typical system management mode implementation, it is intended that battery-buffered SRAM chips be mapped into the address space between 30000h and 3ffffh by default. External hardware can use the SMIACT* signal as a chip select signal and thereby address either the SRAM chips (the SMIACT* signal is at a logic low level), or the normal main memory (the SMIACT* signal is at a logic high level). By using the SMIACT* signal, then, SMM memory 200 and normal memory can be strictly separated.

The Pentium®, or P5, microprocessor is more flexible than earlier processors in that it permits the SMI handler starting address and the location of the SMM memory space to be changed by the user. Under the Pentium® design, the SMI starting address stored in the microprocessor register is initially set to the conventional 30000h value. Consequently, when the first SMI is asserted, the SMI handler starts at address 38000h (the entry point is offset from the SMM memory base). While the SMI handler routine is executing, however, it may provide a different area of memory to be used as the SMM memory. This new SMM memory may start at any location in the main memory space chosen by the programmer. The SMM memory is a 64-Kbyte block beginning at the new SMM memory start address. When the SMI handler finishes, the new starting address replaces the old starting address in the microprocessor's SMI starting address register.

When the next SMI is asserted, the microprocessor maps the new 64-Kbyte block of memory into the main memory space as the SMM memory, and starts the SMI handler at the new starting address at the midpoint of the new SMM memory. For example, during the first SMI service routine, the programmer may change the SMM memory starting point from 030000h to 100000h. When the SMI is next asserted, the microprocessor maps the SMM memory into main memory space between 100000h and 10FFFFh. The microprocessor then references address 108000h for the SMI handler. This feature thus allows the programmer to choose a more convenient location in the main memory.

Figure 2:
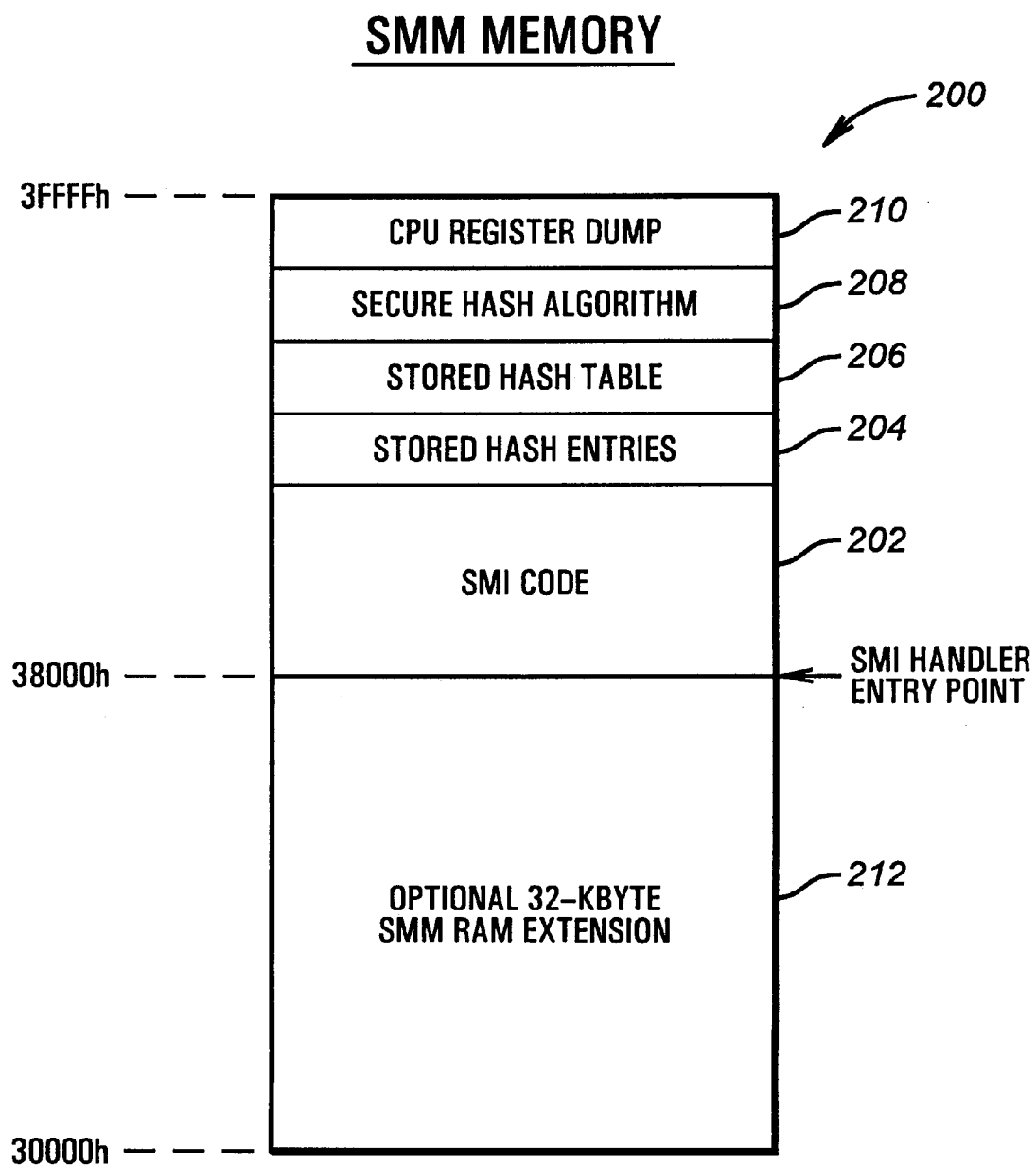
FIG. 2 is a graphical representation of System Management Mode memory according to the present invention.

Referring more specifically to FIG. 2, a graphical representation of SMM memory 200 as configured according to the present invention is shown. As mentioned above, this address space is addressed by the processor 102 following an SMI. Following an SMI, the state of the processor 102 is stored in the CPU register dump 210. The SMI handler 202 is then called and executed by the processor 102. Importantly, the SMI handler 202 can be written such that it performs tasks other than power-down operations. An SMI handler 202 written according to the present invention is able to utilize stored hash entries 204, a stored hash table 206, and a secure hash algorithm 208 to securely register and verify the integrity of software applications prior to execution. Because SMM memory 200 is only addressable while the computer system is in SMM, storing the hash entries 204, a hash table 206 and secure hash algorithm 208 in SMM memory 200 prevents malicious code from modifying or reading these sensitive components of the invention.

In an alternate embodiment of the invention, a secured table hash value for the hash table 206 itself is maintained in SMM memory 200, while the hash table 206 is stored in normal, readable memory. In this embodiment, the integrity of the hash table 206 can then be verified before the hash value of the program to be executed is compared with its original value. This embodiment of the invention, discussed more fully below, is useful for overcoming problems associated with the limited size of SMM memory (64-Kbyte total in the disclosed embodiment). It is also contemplated that the secure hash algorithm 208 could be stored in flash ROM 154. The optional 32-Kbyte SMM RAM extension 212 can be utilized for secure execution of software or to store additional hash values.

In prior virus and integrity checking systems such as that disclosed in the SAFESTART patent, a secure hash value for the first code to be loaded is stored in NVRAM that is locked down after startup. By storing this value in SMM memory 200, however, it can be accessed or modified in real time via the secured SMM path. The invention has the additional advantage that extra hardware is not required to secure the NVRAM as was the case in prior systems.

As used in this disclosure, the term "secure hash value" or "hash value" refers generally to a value—generated by an integrity assessment code—that is specific to a given software application Although the disclosed embodiment of the invention utilizes a hash table 206 containing hash values generated by a secure hash algorithm 208, it is contemplated that many types of modification detection codes could be utilized. Of importance to the invention is that each piece of software to be tracked has a corresponding and fairly unique value that represents the unaltered state of the software, and that this value be stored in a secure memory location.

Figure 3:
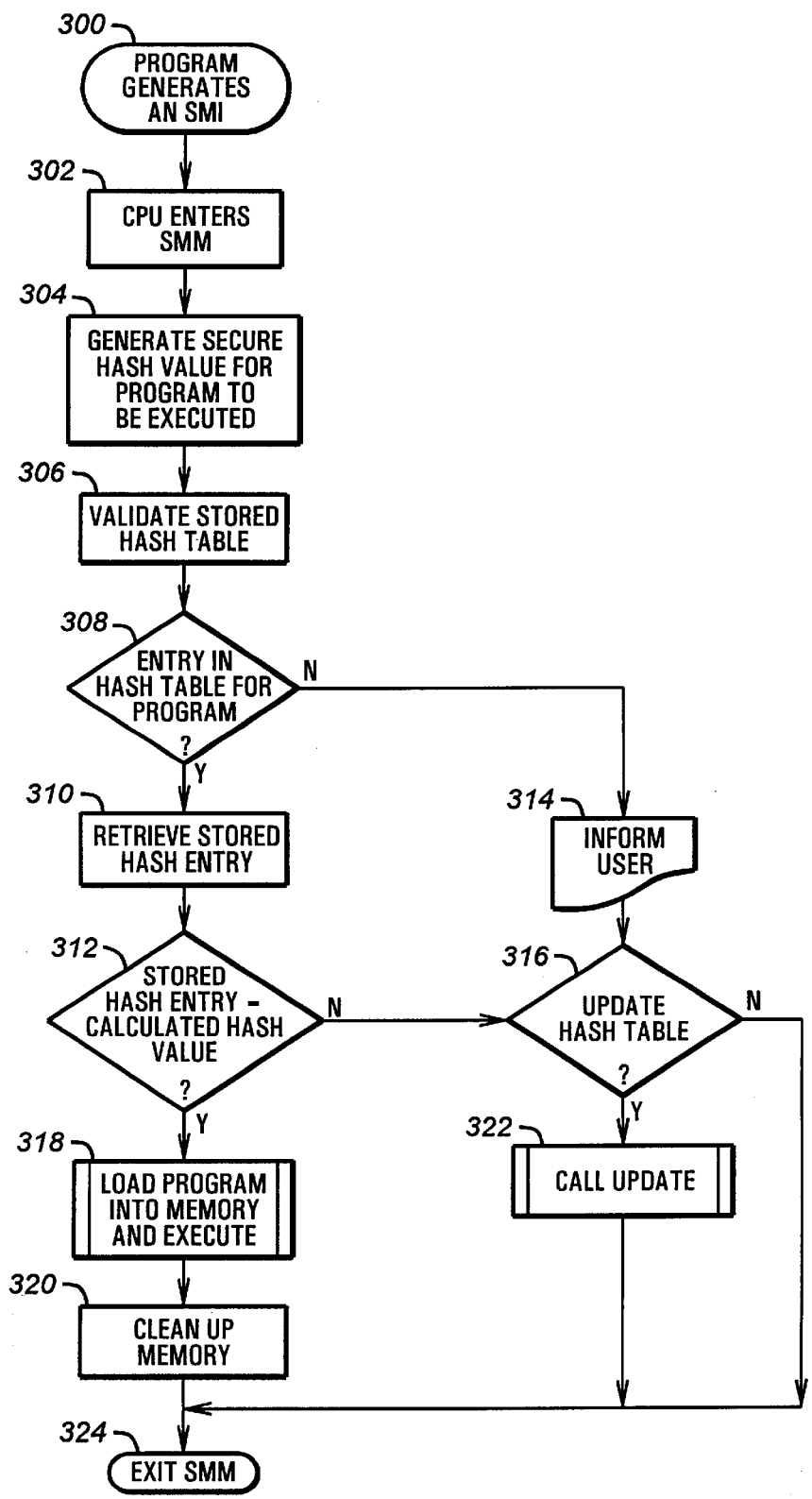
FIG. 3 is a flowchart illustration of a method according to the present invention for securely executing and verifying the integrity of a software application.

Referring now to FIG. 3, a flowchart illustration of a method according to the present invention for securely executing and verifying the integrity of a previously installed program is shown. Control commences in step 300 where an SMI is generated when the user attempts to execute the program. It is contemplated that the SMI could be generated in a variety of ways. Envisioned methods of generating the SMI include but are not limited to: a library call in the code, modification of the loader to generate the SMI prior to loading and executing a program, and a "wrapper" type program such as a Windows manager. Control proceeds to step 302 where the processor 102 enters system management mode as a result of the SMI. It is contemplated that protected operating modes incorporated in future processors could be utilized in lieu of the system management mode, so long as a protected address space is accessible (preferably in real time). In the preferred embodiment, the SMI of step 300 causes an SMI handler 202 to be executed. Execution of the SMI handler 202 is operating system independent.

Control next proceeds to step 304 where the SMI handler 202 requests a secure hash value for the program to be executed. This secure hash value is typically generated by the secure hash algorithm 208. Control then passes to step 306 to validate the stored hash table 206 if it is not stored in SMM memory 200. Validation of the stored hash table 206 is accomplished by first generating a current table hash value for the hash table 206 itself. This new table hash value is then compared with a secure table hash value for the hash table 206. If the two values match, the integrity of the hash table 206 is verified. As mentioned above, this step allows the hash table 206 to be stored in normal memory, thereby allowing a portion of SMM memory 200 to be used for other purposes. Note that any authorized modifications to the hash table 206 must be reflected in an updated secure table hash value. If the hash table 206 is stored in SMM memory 200, step 306 is not required because the hash table 206 is presumptively secure.

As part of step 308, the SMI handler 202 next determines if the hash table 206 contains a hash value corresponding to the program to be executed. Typically, a secure hash value is created for each program to be tracked as part of the program's installation into the computer system S. If a hash value for the program is found, control proceeds to step 310 where the stored hash value is retrieved. Control then proceeds to step 312 for a comparison of the newly generated hash value with the stored hash value. If the two values are the same, control passes to step 318 and the program is loaded into memory and executed. As mentioned, the program or portions of it can be loaded into SMM memory 200 for execution. For example, if the user is performing encryption, it would not be desirable to have the encryption algorithm or password exposed in normal memory. Alternatively, the program can be executed from normal memory if secure execution is not needed. In the later case, system management mode can be exited prior to execution of the program. In either case, control then proceeds to step 320 where the relevant memory is cleaned up. Control next passes to step 324 and system management mode is exited (assuming system management mode was not exited at an earlier point).

If no hash value corresponding to the program to be executed is found as a result of step 308, control proceeds to step 314 and the user is informed that the program is not properly registered to be executed. Control then proceeds to step 316, which is also where control proceeds if the stored hash value does not equal the newly calculated hash value as determined in step 312 (for example, the program has been modified by a virus or a new version of the program has been installed). In step 316, which is an optional enhancement to the invention, the system is configured to query the user to update the hash table 206 and/or stored hash value to incorporate the program as it currently exists. Alternatively, the user could simply be, asked for permission to run the program in its altered state.

If the user desires to update the hash table 206, control passes to step 322 and the subroutine UPDATE 400 (FIG. 4) is called. Following a return from UPDATE 400, or if UPDATE 400 is not called following step 316, control passes to step 324 and the processor 102 exits system management mode.

Figure 4:
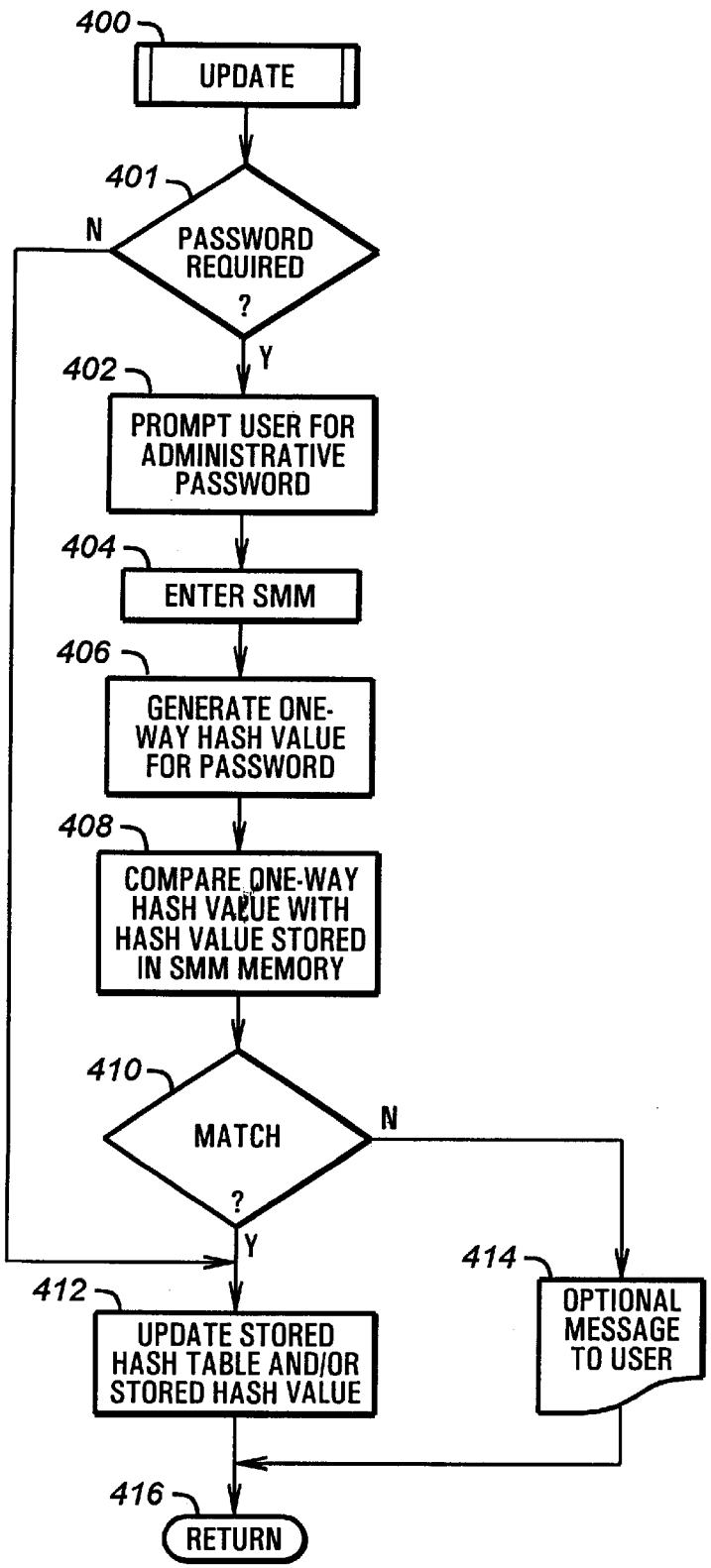
FIG. 4 is a flowchart illustration of a secure method according to the present invention for updating a stored hash table or stored hash value.

Referring now to FIG. 4, a flowchart illustration of a secure method UPDATE 400 for updating a stored hash table or stored hash value is shown. In addition to adding or updating entries for programs that the user wants to verify prior to execution, entries can be deleted for programs that are no longer utilized. The subroutine UPDATE 400 is called in step 322 of FIG. 3.

In an initial step 401, the system determines if an administrative password is required to update the stored hash table or stored hash value. If so, the user is prompted for an "administrative" password. The computer system may leave system management mode while the user is entering the administrative password, although entry of the password may not be entirely secure. An SMI is then generated and the computer system enters system management mode in step 404. Control then proceeds to step 406 and a one-way hash value is generated for the entered password. Proceeding to step 408, this hash value is then compared with a hash value stored in SMM memory 200.

If the hash values match as next determined in step 410, control proceeds to step 412 and the hash table and/or stored hash values are updated according to the user's instructions. Control also passes to step 412 if an administrative password is not required as determined in step 401. If the hash values do not match as determined in step 410, control passes to step 414 and the user is informed of the discrepancy. In either case, control next proceeds to step 416 for a return to the main routine of FIG. 3.

When a computer system is operating in a standard mode, it is relatively easy for a programmer to "hook" keyboard interrupts and copy keystroke information as it is being communicated. Thus, the updating subroutine described in FIG. 4 is not entirely secure if the system leaves SMM. An improved method for establishing a secure keyboard link to enter password and other information is disclosed in U.S. Pat. No. 5,748,888 entitled "METHOD AND APPARATUS FOR PROVIDING SECURE AND PRIVATE KEYBOARD COMMUNICATIONS IN COMPUTER SYSTEMS", filed May 29, 1996 and hereby incorporated by reference. As described therein, to keep a password or other sensitive information from being visible to malicious code it can be communicated via a secure keyboard link to a "black box" security device integrated within a system component such as the PCI-ISA bridge 130. The password data as well as user-entered keystrokes are not stored in normal readable memory, preventing them from being surreptitiously obtained. The secured keyboard link is initiated by the SMI handler and each keystroke is sent to the black box while the system is in SMM. The keystrokes are not visible to any other processes, and the black box can only be written in this manner. It is contemplated that this method could be used to enter an administrative password required to update the secured hash table.

In another embodiment of the invention, the computer system S could be configured such that execution of any registered program can only occur when the computer system S is in a so-called "administrative mode". Access to administrative mode could be predicated on entry of a valid administrative password.

In yet another embodiment of the invention, a modification to the loader is used to dynamically protect against virus infestation and unauthorized modifications. The loader (a part of the operating system that puts programs into memory for execution) is modified such that it verifies the program's hash value prior to execution. The loader can be modified to generate an SMI prior to execution of the application. The comparison of hash values is secure because when the computer is booted, steps are taken to assure that the loader and the stored hash table are secure (i.e. the invention builds on a trusted boot facility such as that described in the SAFESTART patent). In addition to operating in real time, this embodiment has the advantage that special hardware is not required to lock an NVRAM bit to protect hash values, as was the case with earlier protection schemes.

In addition to pure integrity assessment, many other potential applications for the present invention have been considered. These applications include node-locking software to a particular computer by "branding" the software with the serial number of the computer (or its processor identification number) and generating a unique hash number. The unique hash number is then stored in the hash table and cannot be changed without an administrative password or a password supplied by the software manufacturer. Attempts to copy the software and execute it on an unauthorized machine would fail, thereby reducing corporate piracy. This same technique could be used for software licensing on a per-machine basis.

The present invention can also be used to limit the types of programs that are executed on computer system. For example, an employer can omit hash entries for games and other non-productive software that might be installed on its machines. Attempts to circumvent the authorization process by renaming software executables (i.e., changing "game-.exe" to "work.exe") would be destined to fail due to the inevitable mismatch in hash values. Many other uses exist for the present invention, including verification of software that is executed on a scheduled basis and integrity assessment of bootable floppy disks.

Thus, a method for providing secure registration and integrity assessment of software in a computer system has been described. When the user attempts to execute the secured application, a system management interrupt is generated. An SMI handler then generates a hash value for the program to be executed. Next, the SMI handler checks a stored hash table for an entry for the secured application. If a hash value entry is found, it is compared with the newly calculated hash value for the secured application. In the event the two values match, the integrity of the application is guaranteed and it is loaded into either system management mode memory or normal memory and executed. If the two values do not match, the user is alerted to the discrepancy and may be given the option to update or override the stored hash table entry by entering an administrative password. The present invention operates in real time and incorporates both software protection and integrity assessment concepts, resulting in a more thorough and flexible approach to system security.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for providing secure registration and integrity assessment of software in a computer system having a processor incorporating system management capabilities, the computer system also having a stored table containing a modification detection value for each program or logical file to be validated, wherein the stored table is maintained in system management memory or other protected memory that is accessible only when the computer system is in a non-typical operating mode such as system management mode, the method comprising the steps of:

storing a program or logical file on a disk drive;

generating a system management interrupt in response to a request to execute the program or access the logical file stored on the disk drive;

placing the computer system in system management mode as a result of said step of generating a system management mode interrupt; and executing a system management interrupt handler upon entry into system management mode, wherein said execution of the system management interrupt handler comprises the steps of:
- generating a current modification detection value for the requested program or logical file;
- determining if the stored table contains a secure modification detection value for the requested program or logical file;
- retrieving the secure modification detection value if it exists in the stored table;
- comparing the current modification detection value to the secure modification detection value if it exists in the stored table; and
- permitting execution of the requested program or access to the requested logical file if the secure modification detection value exists in the stored table and the current modification detection value matches the secure modification detection value.

2. The method of claim 1, wherein the secure modification detection value and the current modification detection value are hash values generated by a hash algorithm.

3. The method of claim 1, further comprising the steps of:
- following said step of determining if the stored table contains a secure modification detection value for the requested program or logical file, alerting the user if the stored table does not contain a secure modification detection value for the requested program or logical file;
- determining if the user desires to update the stored table to include a secure modification detection value for the requested program or logical file;
- determining if an administrative password is required to update the stored table;
- requesting an administrative password that allows access to the stored table if the user desires to update the stored table and an administrative password is required; and
- updating the stored table to include a secure modification detection value for the requested program or logical file if the user desires to update the stored table and no administrative password is required or following entry of the administrative password if an administrative password is required.

4. The method of claim 3, further comprising the steps of:
- following said step of comparing the current modification detection value to the secure modification detection value, alerting the user if the current modification detection value is not equal to the secure modification detection value;
- determining if the user desires to update the stored table to include the current modification detection value;
- determining if an administrative password is required to update the stored table;
- requesting an administrative password that allows access to the stored table if the user desires to update the stored table and an administrative password is required; and
- updating the stored table to include the current modification detection value if the user desires to update the stored table and no administrative password is required or following entry of the administrative password if an administrative password is required.

5. A method for providing secure registration and integrity assessment of software in a computer system incorporating a processor having system management, the computer system also having a stored table containing a modification detection value for each program or logical file to be validated, wherein the stored table is maintained in normal memory and a secure table modification detection value for the stored table itself is maintained in system management memory or other protected memory that is accessible only when the computer system is in a non-typical operating mode such as system management mode, the method comprising the steps of:
- storing a program or logical file on a disk drive;
- generating a system management interrupt in response to a request to execute the program or access the logical file stored on the disk drive;
- placing the computer system in system management mode as a result of said step of generating a system management mode interrupt; and
- executing a system management interrupt handler upon entry into system management mode, wherein said execution of the system management interrupt handler comprises the steps of:
  - generating a current table modification detection value for the stored table;
  - comparing the current table modification detection value to the secure table modification detection value;
  - generating a current modification detection value for the requested program or logical file if the current table modification detection value is equal to the secure table modification detection value;
  - determining if the stored table contains a secure modification detection value for the requested program or logical file;
  - retrieving the secure modification detection value if it exists in the stored table;
  - comparing the current modification detection value to the secure modification detection value if it exists in the stored table; and
  - permitting execution of the requested program or access to the requested logical file if the secure modification detection value exists in the stored table and the current modification detection value matches the secure modification detection value.

6. The method of claim 5, wherein the secure table modification detection value, the current table modification detection value, the secure modification detection value and the current modification detection value are hash values generated by a hash algorithm.

7. The method of claim 5, further comprising the steps of:
- following said step of determining if the stored table contains a secure modification detection value for the requested program or logical file, alerting the user if the stored table does not contain a secure modification detection value for the requested program or logical file;
- determining if the user desires to update the stored table to include a secure modification detection value for the requested program or logical file;
- requesting an administrative password that allows access to the secure table modification detection value if the user desires to update the stored table;
- updating the stored table to include a secure modification detection value for the requested program or logical file following entry of the administrative password; and
- updating the secure table modification detection value to correspond to the updated stored table.

8. The method of claim 5, further comprising the steps of:
- following said step of comparing the current modification detection value to the secure modification detection value, alerting the user if the current modification detection value is not equal to the secure modification detection value;

determining if the user desires to update the stored table to include the current modification detection value;

requesting an administrative password that allows access to the secure table modification value if the user desires to update the stored table;

updating the stored table to include the current modification detection value following entry of the administrative password; and updating the secure table modification detection value to correspond to the updated stored table.

9. A method for limiting execution of a software program to a specified computer system, the computer system incorporating system management capabilities, the computer system further having a unique identification number, the method comprising the steps of:

modifying the program to contain the unique identification number;

storing the modified program on a peripheral storage device;

generating a modification detection value for the modified program;

storing the modification detection value in a system management memory of the computer system;

generating a system management interrupt in response to a request to execute the modified program;

placing the computer system in system management mode as a result of said step of generating a system management mode interrupt; and executing a system management interrupt handler upon entry into system management mode, wherein said execution of the system management interrupt handler comprises the steps of:

generating a current modification detection value for the modified program;

determining if system management memory contains a secure modification detection value for the modified program;

retrieving the secure modification detection value if it is present in system management memory;

comparing the current modification detection value to the secure modification detection value; and permitting execution of the modified program stored on a peripheral storage device if the current modification detection value matches the secure modification detection value.

10. The method of claim 9, wherein the secure modification detection value and the current modification detection value are hash values generated by a hash algorithm.

11. A computer system comprising:

a processor incorporating system management mode or similar capabilities;

a disk drive containing a program or logical file;

a system management memory that is accessible only when the computer system is in a non-typical operating mode such as system management mode, the system management memory containing:

a modification detection code for generating a modification detection value;

a secure modification detection value for the program or logical file contained on the disk drive, wherein the secure modification detection value represents an authorized or unaltered condition for the program or logical file; and a system management mode interrupt handler routine for directing the processor to:

generate a current modification detection value for the program or logical file via said modification detection code;

determine if the current modification detection value is equal to the secure modification detection value; and permit execution of the program or access to the logical file if the current modification detection value is equal to the secure modification detection value; and means for generating a system management interrupt in response to a request to execute the program or access the logical file, wherein the system management interrupt causes the system management interrupt handler routine to be executed.

12. The computer system of claim 11, wherein the modification detection code is a hash algorithm and the modification detection values are hash values.

13. A method for providing secure registration and integrity assessment of software in a computer system having a processor incorporating system management capabilities, the computer system also having a stored table containing a modification detection value for each program or logical file to be validated, wherein the stored table is maintained in system management memory or other protected memory that is accessible only when the computer system is in a non-typical operating mode such as system management mode, the method comprising the steps of:

generating a system management interrupt in response to a request to execute the program or access the logical file;

placing the computer system in system management mode as a result of said step of generating a system management mode interrupt; and executing a system management interrupt handler upon entry into system management mode, wherein said execution of the system management interrupt handler comprises the steps of:

generating a current modification detection value for the requested program or logical file;

determining if the stored table contains a secure modification detection value for the requested program or logical file;

retrieving the secure modification detection value if it exists in the stored table;

comparing the current modification detection value to the secure modification detection value if it exists in the stored table; and permitting execution of the requested program or access to the requested logical file if the secure modification detection value exists in the stored table and the current modification detection value matches the secure modification detection value.

14. The method of claim 13, wherein the secure modification detection value and the current modification detection value are hash values generated by a hash algorithm.

15. The method of claim 13, further comprising the steps of:

following said step of determining if the stored table contains a secure modification detection value for the requested program or logical file, alerting the user if the stored table does not contain a secure modification detection value for the requested program or logical file;

determining if the user desires to update the stored table to include a secure modification detection value for the requested program or logical file;

determining if an administrative password is required to update the stored table;

requesting an administrative password that allows access to the stored table if the user desires to update the stored table and an administrative password is required; and updating the stored table to include a secure modification detection value for the requested program or logical file if the user desires to update the stored table and no administrative password is required or following entry of the administrative password if an administrative password is required.

16. The method of claim 15, further comprising the steps of:

following said step of comparing the current modification detection value to the secure modification detection value, alerting the user if the current modification detection value is not equal to the secure modification detection value;

determining if the user desires to update the stored table to include the current modification detection value;

determining if an administrative password is required to update the stored table;

requesting an administrative password that allows access to the stored table if the user desires to update the stored table and an administrative password is required; and updating the stored table to include the current modification detection value if the user desires to update the stored table and no administrative password is required or following entry of the administrative password if an administrative password is required.

17. A method for providing secure registration and integrity assessment of software in a computer system incorporating a processor having system management, the computer system also having a stored table containing a modification detection value for each program or logical file to be validated, wherein the stored table is maintained in normal memory and a secure table modification detection value for the stored table itself is maintained in system management memory or other protected memory that is accessible only when the computer system is in a non-typical operating mode such as system management mode, the method comprising the steps of:

generating a system management interrupt in response to a request to execute the program or access the logical file;

placing the computer system in system management mode as a result of said step of generating a system management mode interrupt; and executing a system management interrupt handler upon entry into system management mode, wherein said execution of the system management interrupt handler comprises the steps of:

generating a current table modification detection value for the stored table;

comparing the current table modification detection value to the secure table modification detection value;

generating a current modification detection value for the requested program or logical file if the current table modification detection value is equal to the secure table modification detection value;

determining if the stored table contains a secure modification detection value for the requested program or logical file;

retrieving the secure modification detection value if it exists in the stored table;

comparing the current modification detection value to the secure modification detection value if it exists in the stored table; and permitting execution of the requested program or access to the requested logical file if the secure modification detection value exists in the stored table and the current modification detection value matches the secure modification detection value.

18. The method of claim 17, wherein the secure table modification detection value, the current table modification detection value, the secure modification detection value and the current modification detection value are hash values generated by a hash algorithm.

19. The method of claim 17, further comprising the steps of:

following said step of determining if the stored table contains a secure modification detection value for the requested program or logical file, alerting the user if the stored table does not contain a secure modification detection value for the requested program or logical file;

determining if the user desires to update the stored table to include a secure modification detection value for the requested program or logical file;

requesting an administrative password that allows access to the secure table modification detection value if the user desires to update the stored table;

updating the stored table to include a secure modification detection value for the requested program or logical file following entry of the administrative password; and updating the secure table modification detection value to correspond to the updated stored table.

20. The method of claim 17, further comprising the steps of:

following said step of comparing the current modification detection value to the secure modification detection value, alerting the user if the current modification detection value is not equal to the secure modification detection value;

determining if the user desires to update the stored table to include the current modification detection value;

requesting an administrative password that allows access to the secure table modification value if the user desires to update the stored table;

updating the stored table to include the current modification detection value following entry of the administrative password; and updating the secure table modification detection value to correspond to the updated stored table.

21. A method for limiting execution of a software program to a specified computer system, the computer system incorporating system management capabilities, the computer system further having a unique identification number, the method comprising the steps of:

modifying the program to contain the unique identification number;

generating a modification detection value for the modified program;

storing the modification detection value in a system management memory of the computer system;

generating a system management interrupt in response to a request to execute the modified program;

placing the computer system in system management mode as a result of said step of generating a system management mode interrupt; and executing a system management interrupt handler upon entry into system management mode, wherein said execution of the system management interrupt handler comprises the steps of:

generating a current modification detection value for the modified program;

determining if system management memory contains a secure modification detection value for the modified program;

retrieving the secure modification detection value if it is present in system management memory;

comparing the current modification detection value to the secure modification detection value; and permitting execution of the modified program if the current modification detection value matches the secure modification detection value.

22. The method of claim 21, wherein the secure modification detection value and the current modification detection value are hash values generated by a hash algorithm.

23. A computer system comprising:

a processor incorporating system management mode or similar capabilities;

a system management memory that is accessible only when the computer system is in a non-typical operating mode such as system management mode, the system management memory containing:

a modification detection code for generating a modification detection value;

a secure modification detection value for a program or logical file, wherein the secure modification detection value represents an authorized or unaltered condition for the program or logical file; and a system management mode interrupt handler routine for directing the processor to:

generate a current modification detection value for the program or logical file via said modification detection code;

determine if the current modification detection value is equal to the secure modification detection value; and permit execution of the program or access to the logical file if the current modification detection value is equal to the secure modification detection value; and means for generating a system management interrupt in response to a request to execute the program or access the logical file, wherein the system management interrupt causes the system management interrupt handler routine to be executed.

24. The computer system of claim 23, wherein the modification detection code is a hash algorithm and the modification detection values are hash values.

* * * * *